United States Patent

DeJoseph

[11] Patent Number: 6,108,672
[45] Date of Patent: Aug. 22, 2000

[54] MULTIPLE COMPANY INTEGRATED DOCUMENTS PRODUCTION

[75] Inventor: Anthony B. DeJoseph, E. Amherst, N.Y.

[73] Assignee: Moore Business Forms, Inc., Grand Island, N.Y.

[21] Appl. No.: 08/725,829

[22] Filed: Oct. 7, 1996

[51] Int. Cl.⁷ ............................. G06F 17/00; G06F 17/24; G06F 15/00
[52] U.S. Cl. ...................... 707/505; 707/506; 707/516; 345/302
[58] Field of Search ................................. 707/500–517, 707/526; 705/1–4, 29–30; 101/178; 395/101–117

[56] References Cited

U.S. PATENT DOCUMENTS

| | | |
|---|---|---|
| 618,662 | 1/1899 | Grout . |
| 3,523,638 | 8/1970 | Moonan . |
| 4,674,040 | 6/1987 | Barker et al. ........................... 707/200 |
| 4,690,433 | 9/1987 | Showers et al. . |
| 4,928,875 | 5/1990 | Hutchinson . |
| 5,121,945 | 6/1992 | Thomson et al. ......................... 283/58 |
| 5,241,464 | 8/1993 | Greulich et al. .......................... 705/26 |
| 5,297,488 | 3/1994 | Bunch, Jr. . |
| 5,320,276 | 6/1994 | Van Malderghem et al. . |
| 5,483,445 | 1/1996 | Pickering ................................. 364/406 |
| 5,615,316 | 3/1997 | Imai et al. .............................. 358/1.18 |
| 5,701,184 | 12/1997 | Motoyama ............................... 358/450 |
| 5,740,338 | 4/1998 | Gauthier et al. ........................ 358/1.17 |
| 5,845,302 | 12/1998 | Cyman, Jr. et al. ..................... 707/517 |

FOREIGN PATENT DOCUMENTS

| | | |
|---|---|---|
| 0 527 552 A2 | 2/1993 | European Pat. Off. . |
| 0 587 322 A2 | 3/1994 | European Pat. Off. . |
| 0 703 524 A1 | 3/1996 | European Pat. Off. . |
| WO 83/01521 | 4/1983 | WIPO . |
| WO 96/19352 | 6/1996 | WIPO . |

*Primary Examiner*—Joseph H. Feild
*Assistant Examiner*—Alford W. Kindred
*Attorney, Agent, or Firm*—Nixon Vanderhye P.C.

[57] ABSTRACT

A single document page with multiple different variable indicia from a least two discrete sources is produced using a computer control and an imaging system (such as a selective flexographic system with ion deposition or ink jet stations), variable database streams and variable data streams from at least two discrete sources are fed to the same computer control, which is then used to control the imaging system to merge the variable database streams and variable data streams from at least two discrete sources to that they may be imaged on the same document page. Paper is fed to the imaging system, and using the imaging system the same document page is imaged with variable database indicia from the multiple discrete sources. Three, or even more, discrete sources can be utilized, and each discrete source may also have a distinct form structure so that the variable data indicia and variable database indicia are each placed in their own distinct form structure. The variable database streams may include company name and logo data, coupon data, direct marketing messages, and/or images, or the like, while the variable data streams include alphanumeric characters which convey account and/or billing information. All of the indicia may be imaged on the same face of a single sheet (e.g. having a maximum length of about 12 inches and a maximum width of about 9 inches), and imaging may take place on a web which is then cut into individual single pages.

21 Claims, 5 Drawing Sheets

MULTIPLE COMPANY INTEGRATED DOCUMENTS PRODUCTION

BACKGROUND AND SUMMARY OF THE INVENTION

Present business practices worldwide are moving toward various companies forming alliances. For example, credit card companies often offer products or services of other companies as incentives to use the credit cards. For example, airline frequent flyer miles may be offered, or reduced rates or free long distance telephone service on particular long distance carriers. Under these circumstances, it would be highly desirable to be able to produce a single document for a particular end user (customer) which had account or billing information from more than one different company.

There are also many other circumstances, even where a direct alliances between companies are not utilized, where it would be highly efficient and desirable to be able to provide a single end user (customer) with information about more than one different account in the same document. This would save paper and mailing costs for the companies involved. A number of different companies could put out a "common" mailing in which for any common end users the necessary account and/or billing information would be printed on the same document.

According to the present invention, the desired goals set forth above can be accomplished in a realistic and cost effective manner utilizing a computer control system, such as the Moore Business Forms, Inc. (of Lake Forest, Ill.) XL Data System, and electronic information provided from a number of different companies can be successfully manipulated and merged during printing using known flexographic printing equipment, or electronic imaging equipment, to produce a single document page with multiple different variable indicia thereon from two or more discrete sources therein. The equipment that is utilized to practice the invention may be the equipment such as disclosed in U.S. Patent Application Ser. No. 08/359,697, filed Dec. 20, 1994 (also shown in PCT Publication WO 96/19352, published Jun. 27, 1996), the disclosure of which is hereby incorporated by reference herein.

According to one aspect of the present invention, a method of producing a single document page with multiple different variable indicia thereon, from at least two discrete sources, using a computer control and an imaging system is provided. The method comprises the steps of: (a) Feeding variable database streams and variable data streams from at least two discrete sources to the same computer control. (b) Using the same computer control, controlling the imaging system to merge the variable database streams and variable data streams from the at least two discrete sources so that they may be imaged on the same document page. (c) Feeding paper to be imaged to the imaging system. And (d) using the imaging system, imaging the same document page with variable data indicia and variable database indicia from the at least two discrete sources.

Three discrete sources may be provided, each having unique variable database streams, and unique variable data stream, in which case steps (a) through (d) are practiced to image on the same document page three or more different variable data indicia, and variable database indicia. Each discrete source may also have a distinct form structure in which case step (a) is practiced to feed the distinct form structures from the discrete sources to the computer control, and step (b) is practiced to merge the distinct form structures from the discrete sources in the imaging system, and step (d) is practiced to image the variable data indicia and the variable base indicia on the same document page in their respective distinct form structures from the discrete sources.

While the variable indicia provided may encompass a wide variety of different forms, preferably the variable data base streams include company name and logo data (and also perhaps coupon information and/or direct marketing messages, and images), while the variable data streams include alphanumeric characters which convey at least one of account and billing information (such as a bank credit card statement and associated frequent flyer miles for a particular airline that have been earned by using the credit card).

Steps (a) through (d) may be practiced to image on the same face of a sheet—having a maximum length of about twelve inches and a maximum width of about nine inches (e.g. standard letter size or A4 paper)—all of the desired data. Step (c) may be practiced to feed the paper in web form to the imaging system, in which case there is the further step (e), after step (d), of cutting the web into individual single pages. The imaging system may be a flexographic imaging system (such as in co-pending application Ser. No. 08/359, 697), in which case step (d) is practiced to image indicia on the single document pages flexographically, or non-variable data may be imaged flexographically and variable data with an ion deposition or ink jet printer, or the like.

According to another aspect of the present invention, a single document page with multiple different variable indicia thereon, from at least two discrete sources, produced using a computer control in an imaging system, is provided. The document page is produced by the steps of: (a) Feeding variable database streams and variable data streams from at least two discrete sources to the same computer control. (b) Using the same computer control, controlling an imaging system to merge the variable database streams and variable data streams from the at least two discrete sources so that they may be imaged on the same document page. (c) Feeding paper to be imaged to the imaging system. And (d) using the imaging system, imaging the same document page with variable data indicia and variable database indicia from the at least two discrete sources.

The document pages set forth above may be further produced by a method wherein (c) is practiced to feed the paper in web form to the imaging system; and by the further step (e), after step (d), of cutting the web into individual single pages including the document page. The document page may include variable data indicia and variable data base indicia from three or more different sources, each in discrete form structure on the page. The variable data base streams may include company name and logo data, direct marketing messages, and/or images and the variable data streams may include alphanumeric characters which convey at least one of account and billing information, e.g. so that the document page includes three different company names and logos and three different account and/or billing information character sets (e.g. on the same face).

According to another aspect of the present invention a single document page having a first face for delivery to a predetermined individual is provided comprising the following elements: First and second distinct form structures. First and second distinct variable database indicia for the predetermined individual. First and second distinct variable data indicia for the predetermined individual. The first variable database indicia and first variable data indicia imaged in the first form structure on the single document page first face. And the second variable database indicia and second variable data indicia imaged in the second form structure on the single document page first face.

The page as set forth above may be in combination with, and contained within, an envelope with address indicia thereon identifying the predetermined individual. The variable data base indicia may comprise company name and logo indicia, direct marketing messages, and/or images, while the variable data indicia comprises alphanumeric characters which convey at least one of account and billing information. Three, or even more, distinct form structures, variable database indicia, and variable data indicia, may be provided.

It is a primary object of the present invention to efficiently produce and present variable data from at least two discrete sources on the same document page. This and other objects of the invention will become clear from a detailed description of the invention and from the appended claims.

DETAILED DESCRIPTION OF THE DRAWINGS

Figure 1:
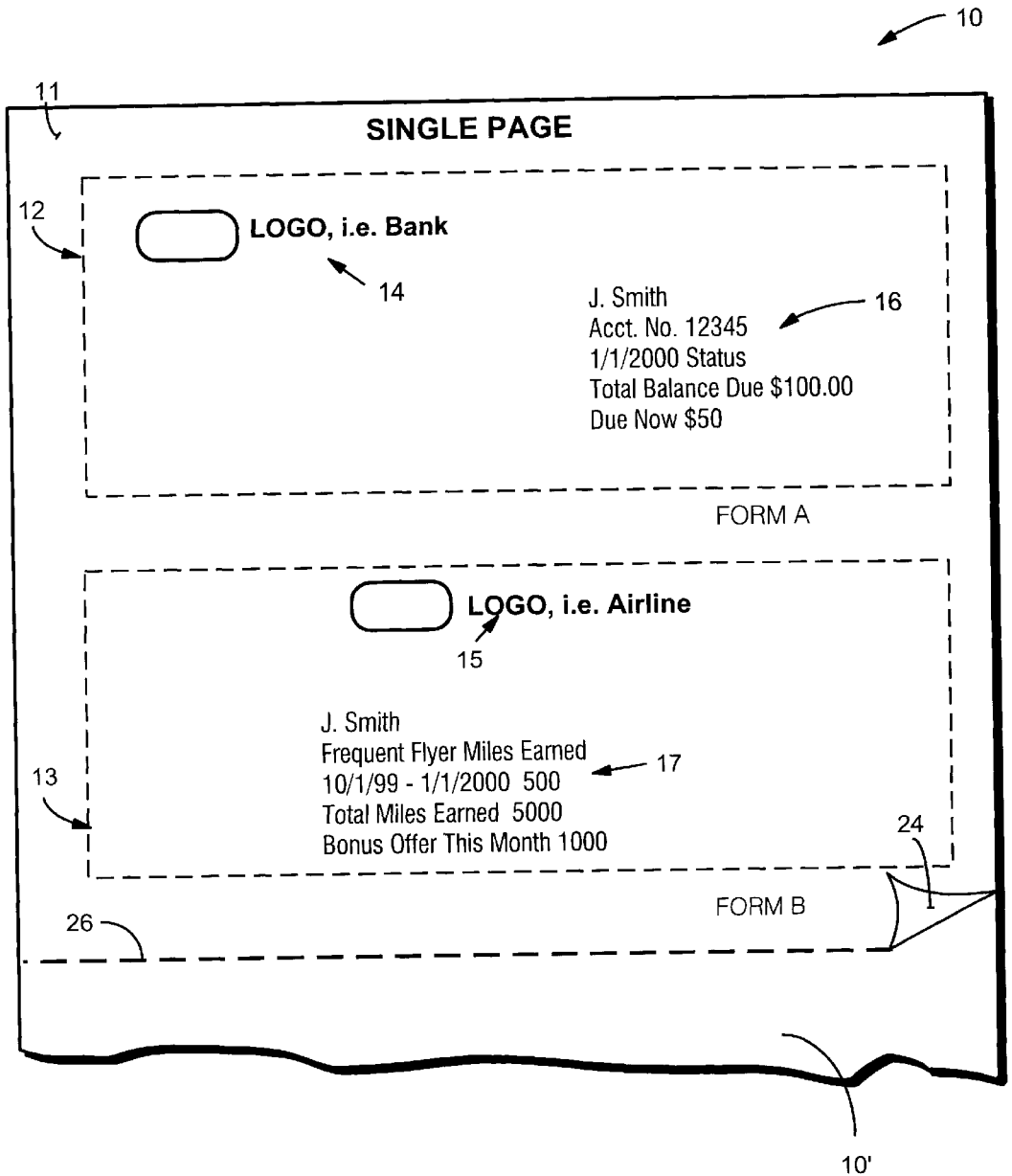
FIG. 1 is a top plan view of the first embodiment of an exemplary single document page according to the present invention.
Figure 2A:
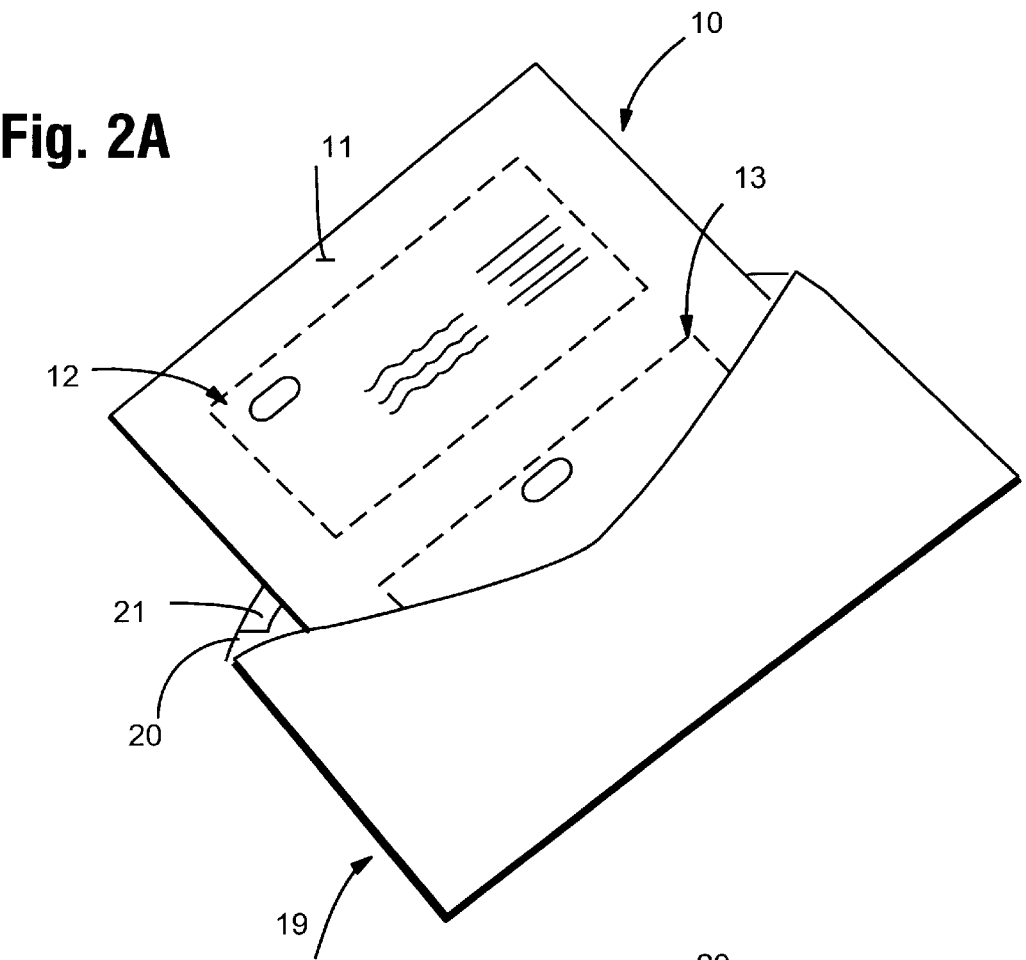
FIGS. 2A and 2B are rear and front perspective views, respectively, of the document page of FIG. 1 in association with an envelope to be mailed.
Figure 2B:
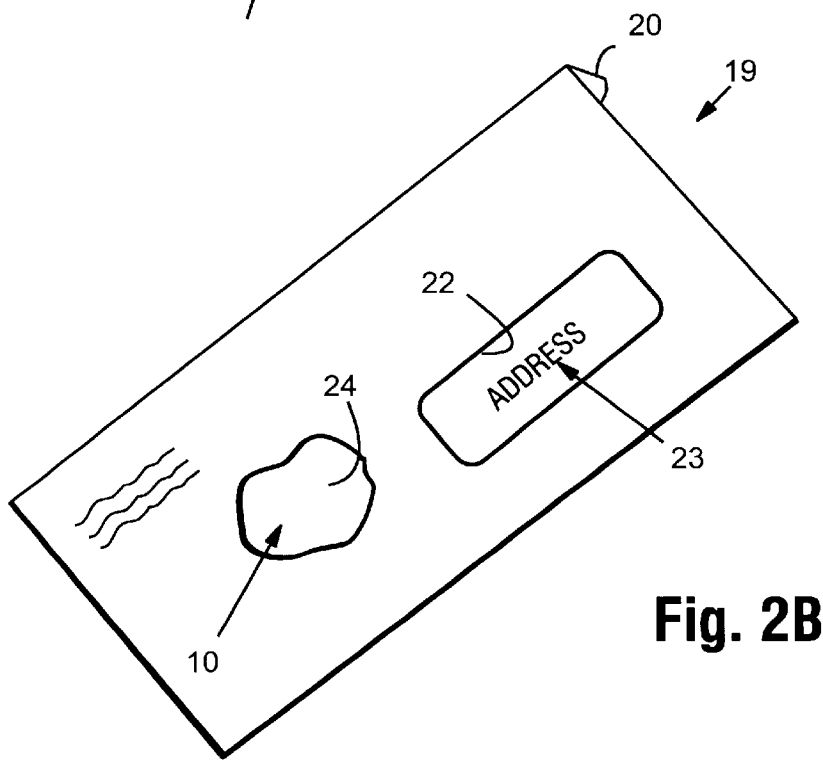

A single document page that is produced according to the present invention is illustrated, in a first embodiment thereof, generally by reference numeral 10 in FIGS. 1 and 2A, 2B. On a first face 11 of the document page 10 are first and second distinct form structures, shown generally by reference numerals 12 and 13 in FIG. 1. First and second distinct variable database indicia for a predetermined individual, who is to receive delivery of the document page 10, are also provided, illustrated schematically at 14 and 15 in FIG. 1. First and second distinct variable data indicia for the predetermined individual are illustrated schematically at 16 and 17 in FIG. 1. The first variable database indicia 14 and the first variable data 16 are imaged (e.g. printed in flexographic printing, with toner, e.g. electronically such as using a Moore Business Forms Midax® system, or like electrostatic printing techniques, or with ink jet printers) on the face 11 in the first form structure, while the second variable database indicia is obtainable and second variable data indicia 17 are imaged in the second form structure 13 on the face 11.

The variable database indicia 14, 15 may comprise the company name and logo, such as illustrated in FIG. 1. For example, the company name and logo 14 may be a bank name or logo, the bank issuing a credit card statement. The indicia 15 may be an airline name or logo, e.g. an airline issuing frequent flyer account information. While the form structures 12, 13 are illustrated as in different formats in FIG. 1, if desired the form structures 12, 13 can actually have the same format, but would remain distinct because of the indicia 14–17 associated therewith.

The variable data indicia 16, 17 may also be from a wide variety of different sources or types, but preferably includes alphanumeric characters which convey at least one of account and billing information.

The document page 10 is designed to ultimately be sent to the predetermined individual, such as within the envelope 19 illustrated in FIGS. 2A and 2B. The envelope 19 may be of any conventional type, including having a flap 20 with adhesive 21 thereon that is sealed, and may have a window 22 (e.g. through which the address information/indicia 23 appears). The address indicia 23, which is variable address indicia corresponding to the predetermined individual for whom the account/or billing information on the sheet 10 is provided, may be imaged on the opposite face 24 of the document page 10 from the face 11 (see FIGS. 1 and 2B), or the address information 23 may be imaged on the face 11 and the page 10 folded or positioned within the envelope 19 (either of the size illustrated in FIGS. 2A and 2B, or a size corresponding to the full size of the document page 10) so that the address information 23 is visible either through a window 22, or read by a scanner to produce a solid faced envelope with the address indicia imaged thereon either directly, or on a label which is then placed on the envelope 19.

The document page 10 may be conventional paper, of conventional size, e.g. preferably conventional letter size or A4 paper, e.g. having a maximum length of about 12 inches (e.g. about 11 inches) and a maximum width of about 9 inches (e.g. about 8½ inches); however the document page 10 is not limited to any particular maximum or minimum length or width. While normally a cut sheet form for the page 10 is desirable, under some circumstances it may be connected to other similar pages 10'—as seen in FIG. 1—by lines of weakness at one edge of the document page 10, such as the perforation line 26.

Instead of the address indicia 23, or in addition to it, other variable indicia, or non-variable indica, may be imaged on the face 24, and on the connected document or documents 10'.

Figure 3:
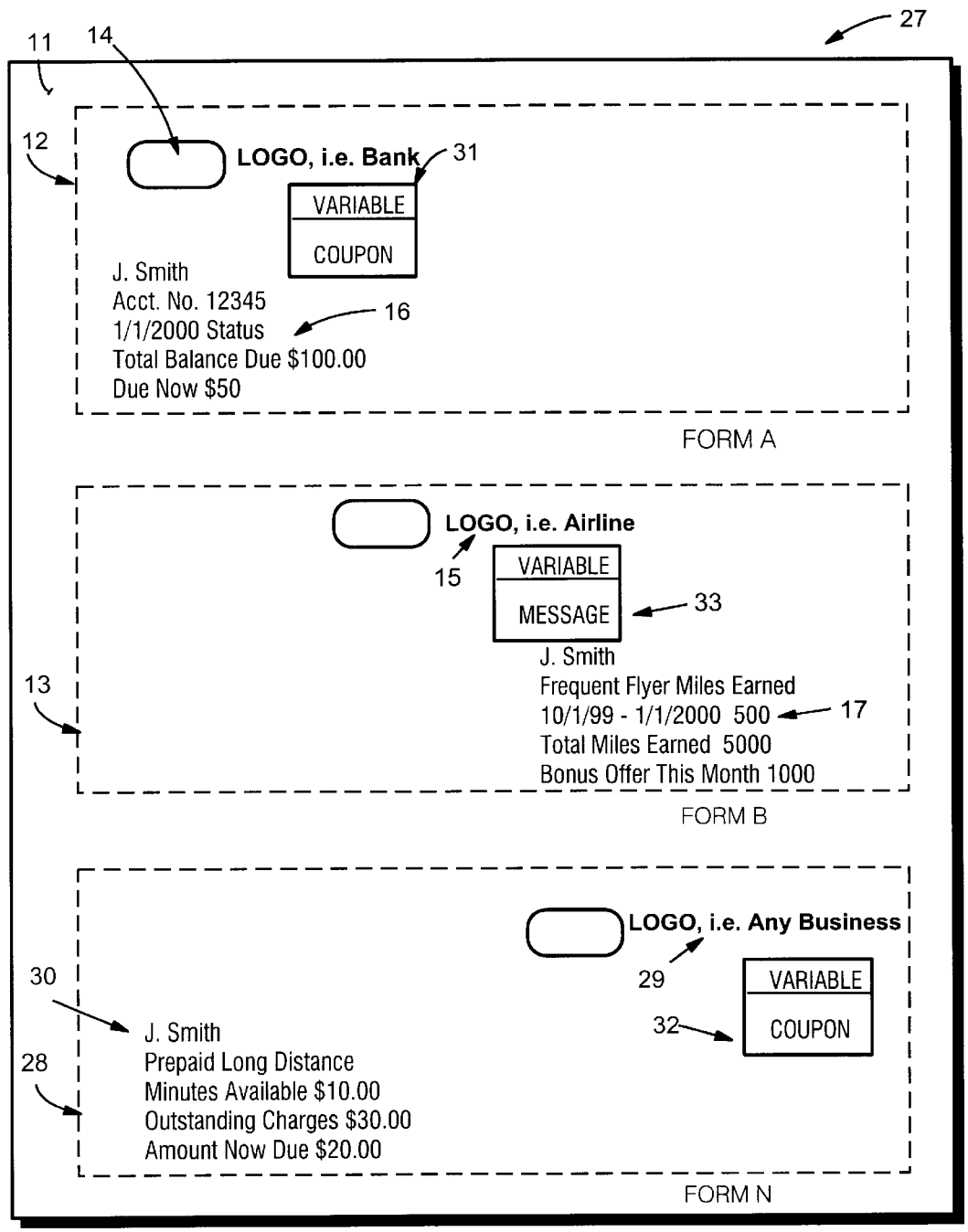
FIG. 3 is a view like that of FIG. 1 for a second embodiment of document page according to the present invention.

FIG. 3 shows another embodiment of a document page 27 according to the present invention. In this document page components that are the same as, or directly comparable to, those in the FIG. 1 embodiment are shown by the same reference numeral. In this particular embodiment, a third discrete form structure 28 is provided having unique variable database indicia 29, and unique data indicia 30, again associated with the same predetermined individual data indicia 14–17. Also, in this particular situation coupon indicia 31 is imaged in association with the form structure 12. If the coupon information 31 is in image (e.g. pictorial or design) form, it will be part of the unique database indicia 14, whereas if it is strictly in alphanumeric characters, it will be part of the data indicia 16. A logo would have image data associated therewith and therefore would be part of the database indicia 14. Similar coupon indicia 32 is associated with a third form structure 28, and variable message of coupon indicia shown generally at reference numeral 33 may be associated with the second form structure 13.

While more than three different form structures 12, 13, 28, with associated indicia, may be imaged on the same document 27 face 11, normally three is the maximum in order to provide an appropriate look for conventional letter size or A4 sheets. However, if longer sheets (such as legal size) are utilized, or continuation sheets, such as the sheet 10' in FIG.

1 are utilized, an almost endless number of form structures from different sources may be imaged, and provided to the same individual in a single mailing.

Figure 4:
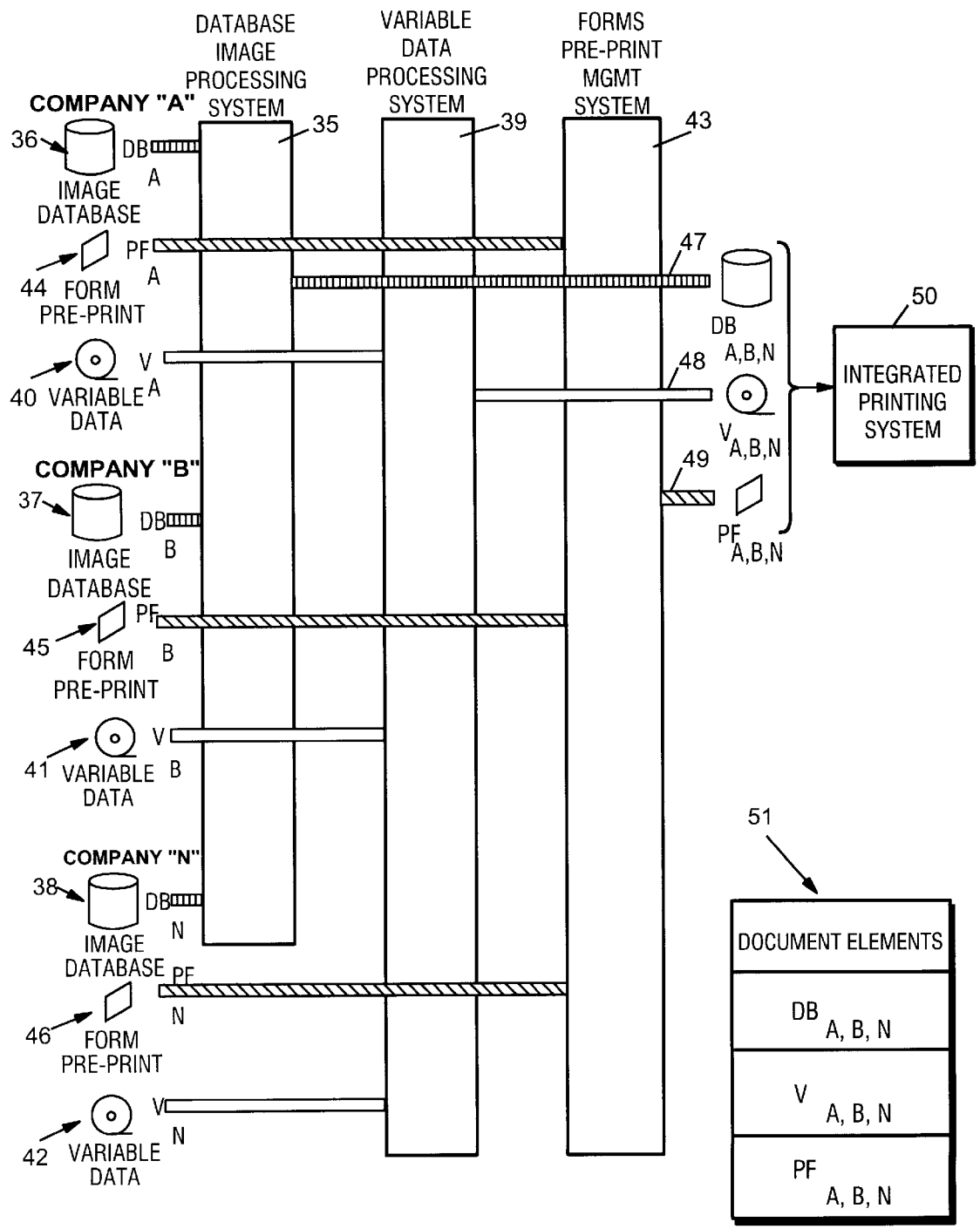
FIG. 4 is a diagrammatic representation illustrating the production of image, form structure, and variable alphanumeric characters, for integration to produce the document page of FIG. 3.

FIG. 4 schematically illustrates the assembly of the electronic data that is utilized to image the pages 10, 27. FIG. 4 is illustrated for the embodiment, corresponding to FIG. 3, where three discrete sources of data (different companies) are assembled, ultimately to be used within an integrated printing system.

The first component of the system illustrated in FIG. 4 is the database image processing system shown schematically at 35. This receives variable database streams, typically including image data, from three different image database sources 36, 37, 38. The processing system 35 may receive database streams electronically from different locations where the image databases 36–38 are provided, e.g. over the phone lines, or by a computer disc, or in any other conventional manner.

The variable data processing system 39 receives variable data streams from the three different sources 40–42. This information also preferably is received electronically.

The forms pre-print management system 43, which controls the discrete form structures, receives form pre-print streams from the three different sources 44–46. The single outputs 47, 48, 49, respectively, in the systems 35, 39, 43 are all ultimately used in integrated printing systems, being provided in electronic form, either by a disc, tape, over phone lines, or the like. The output 49 may be film or a plate.

The systems 35, 39, 43 are computer systems for as simulating the data and may be different parts of the same main frame computer or separate processors integrated (i.e. client/server work stations or disc processors). An exemplary data record associated with the outputs 47–49 from the systems 35, 39, 43 is illustrated at 51 in FIG. 4.

Figure 5:
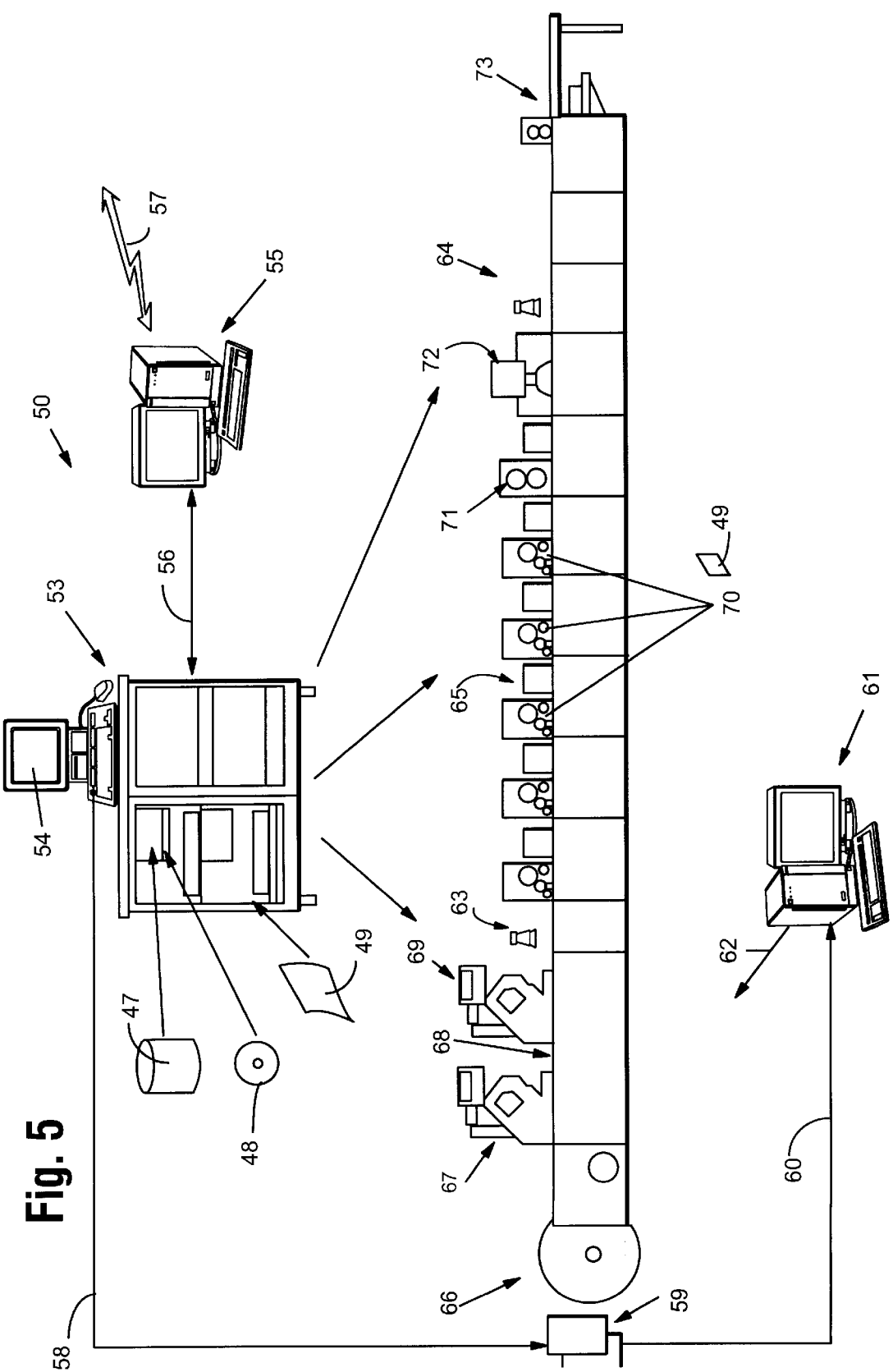
FIG. 5 is a diagrammatic view schematically illustrating various apparatus that may be utilized to practice the method according to the present invention.

FIG. 5 schematically illustrates an integrated printing system 50 that may be utilized according to the present invention, which system may be as described with respect to said co-pending application Ser. No. 08/359,697. The system 50 includes a computer control 53, which preferably is a Moore XL Data System, which receives the inputs 47, 48, 49 from the FIG. 4 systems. The XL Data System 53 is connected up to an operator terminal 54, and includes a high speed data transfer module (HDT). A job composition, second, computer 55 may be provided which has two-way communication—as indicated at 56—with the main computer control 53, and which may have remote proofing capabilities at the company sites to provide the data (e.g. the site of origin of the data streams 36, 40, 44), such communication being illustrated schematically at 57. Optionally line 58 from monitor 54 of computer control 53 may provide input to a production statistics/A/DT trail files unit 59, which may in turn be connected as indicated at 60 to another computer 61 which has a quality architecture database. The computer 61 will provide document verification and job reporting and is connected—as indicated schematically at 62 in FIG. 5—to optional scanners 63, 64 associated with the actual imaging system shown schematically and generally by reference numeral 65 in FIG. 5.

In the embodiment schematically illustrated in FIG. 5 the imaging system 65 includes a conventional paper feeding means shown schematically at 66. While this may be a sheet feeder, preferably it is a paper web on line. The system 65 may include an ion deposition print unit, shown schematically by reference numeral 67, such as a Midax® 300 print engine commercially available from Moore Business Forms, Inc. One or more turn bars, illustrated schematically at 68 in FIG. 5, may be provided, and a second ion deposition print unit 69 may also be provided. A plurality of lo flexographic print units 70 are also provided, and the distinct form structure 49 may be supplied directly to the selective flexographic print station 70 controls rather than through the central computer control 53, both options being schematically illustrated in FIG. 5. The computer control 53 does control all of 67, 69, 70, however, as well as a conventional selective perforation station 71 (e.g. for performing perforations such as 26 in FIG. 1), one or more video inspection stations 72, and an appropriate paper handling mechanism 73 at the end of the system 65. The equipment 73 may be a web rewind, and the rewound web may be transported to another site for separation into the individual document pages 10, 27; or unit 73—as schematically illustrated in FIG. 5 may be a cutoff sheeter/stacker which forms the individual document pages 10, 27. Other conventional paper handling equipment may also be utilized as the equipment 73.

Utilizing the systems as illustrated in FIGS. 4 and 5 the method of producing a single page document 10, 27 with multiple different variable indicia 14–17, 29,30 thereon from at least two discrete sources (36, 40, 44, in FIG. 4 being one source; 37, 41, 45 a second source, and 38, 42, 46, the third source, for example) using the computer control 53 in the imaging system 65 may be provided. The method includes the steps of: (a) Feeding variable database streams 36, 37, 38, composed by the database image processing system 37 to produce common streams 47, and variable data streams 40, 41, 42, composed by the variable data processing system 39 and composed to provide the output streams 48,from at least two discrete sources to the same computer control 53. (b) Using a computer control 53, controlling the imaging system to merge the variable database streams 47 and variable data streams 48 from the at least two discrete sources so that they may be imaged on the same document page 10, 27. (c) Feeding paper, such as with unwind 66, to be imaged to the imaging system 65. And (d) using the imaging system 65, imaging the same document page 10, 27 with variable data indicia 16, 17, 30 and variable database indicia 14, 15, 29 from the at least two discrete sources. Preferably each discrete source also has a distinct form structure as illustrated at 44, 45, 46 in FIG. 4, which distinct form structures are composed by the system 43 to produce the output 49 which also acts through the computer 53 or directly through the individual computer controls for the selective flexographic print station 70 to merge the distinct form structures from the discrete sources to image the steams to produce the indicia 14–17, 29, 30–33 in the appropriate form structures 12, 13, 28. The variable database streams ultimately provided in the composite streams 47 preferably comprise image data, such as company name and logo data, whereas the variable data streams composed in the streams 48 include alphanumeric characters which convey at least one of account and billing information, as schematically illustrated in FIGS. 1 through 3, on the final document pages 10, 27 produced. Steps (a) through (d) may be practiced to image on the same face of the sheet 10, 27 having a maximum length of about 12 inch and a maximum width of about 9 inches. Step (c) may be practiced to view the paper in the web form—as illustrated at 66—to the imaging system 65, in which case there is the further step (e), after step (d), of cutting the web into individual single pages, such as utilizing the lo cutoff sheeter/stacker 73 schematically in FIG. 5. The variable indicia is preferably imaged flexographically using the selective flexographic print unit 70, while non-variable data is imaged on either one or both sides of the sheets using the ion deposition print station 67, 69, or the majority of parts of the variable indicia 14—17, 29, 30 may be imaged by the flexographic print unit 70 while the particular personalized parts such as the account name and number and numerical values are imaged by the ion deposition print units 67, 69.

While it will thus be seen that according to the present invention a single document page may be produced which has variable data from two or more discrete sources. For example, with respect to the embodiment illustrated in FIG. 3 the document page 27 may have imaged on a single face 27 a form structure 12 including indicia 14, 16, 31 providing a credit card issuing bank logo, coupon, and account information, a form structure 13 having airline name and logo 15 and variable message 33 with frequent flyer account information 17, and a long distance telephone company (or other business) form structure 28 having a logo and business name 29, variable coupon 32, and statement or account indicia 30. Thus, the same addressee gets in the same mailing relevant information from three different companies, which makes it easy for the recipient to process, and reduces mailing and printing costs and expenses for the issuing companies.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods, products, and devices.

What is claimed is:

1. A method of producing a single document page with multiple different variable indicia thereon, from at least two discrete company sources, using a computer control and an imaging system, comprising the steps of:
   (a) feeding variable database streams, including company name data from the at least two discrete companies, and variable data streams, including alphanumeric characters which convey at least one of account and billing information, for the at least two companies, from the at least two discrete company sources to the same computer control;
   (b) using the same computer control, controlling the imaging system to merge the variable database streams and variable data streams from the at least two discrete company sources so that they may be imaged on the same document page;
   (c) feeding paper to be imaged to the imaging system;
   (d) using the imaging system, imaging the same document page with variable data indicia, including at least one of account billing information for each company name, and variable database indicia, including company names, from the at least two discrete company sources, and imaging name and address information for a predetermined individual corresponding to said account and billing information; and
   (e) inserting the document page into an envelope also containing address indicia thereon identifying the predetermined individual; and
   wherein the envelope is a window envelope; and wherein (e) is practiced so as to fold a document page so that the address information imaged in step (d) is visible through the window.

2. A document page as recited in claim 1 and further produced by a method wherein step (d) is also practiced to image name and address information for a predetermined individual corresponding to said account and billing information, and further comprising (e) inserting the document page into an envelope also containing address indicia thereon identifying the predetermined individual.

3. A document page with multiple different variable indicia thereon, from at least two discrete company sources, produced using a computer control and an imaging system, and produced by the steps of:
   (a) feeding variable database streams, including company name data from the at least two discrete companies, and variable data streams, including alphanumeric characters which convey at least one of account and billing information, for the at least two companies, from the at least two discrete company sources to the same computer control;
   (b) using the same computer control, controlling an imaging system to merge the variable database streams and variable data streams from the at least two discrete company sources so that they may be imaged on the same document page;
   (c) feeding paper to be imaged to the imaging system;
   (d) using the imaging system, imaging the same document page with variable data indicia, including at least one of account and billing information for each company name, and variable database indicia including company names from the at least two discrete company sources; and imaging name and address information for a predetermined individual corresponding to said account and billing information; and
   (e) inserting the document page into a envelope also containing address indicia thereon identifying the predetermined individual; and
   wherein the envelope is a window envelope, and wherein the method is further practiced so that step (e) is practiced to fold the document page so that the address information is visible through the window.

4. A method of producing a single document page with multiple different variable indicia thereon, from at least two discrete company sources, each discrete source having a distinct form structure, using a computer control and an imaging system, comprising the steps of:
   (a) feeding variable database streams, including company name data from the at least two discrete companies, and feeding variable data streams, including alphanumeric characters which convey at least one of account and billing information, for the at least two companies, and feeding distinct form structures from the at least two discrete company sources, to the same computer control;
   (b) using the same computer control, controlling the imaging system to merge the variable database streams, distinct form structures, and variable data streams, from the at least two discrete company sources so that they may be imaged on the same document page;
   (c) feeding paper to be imaged to the imaging system; and
   (d) using the imaging system, imaging the same document page with variable data indicia, including at least one of account billing information for each company name, and variable database indicia, including company names, on the same document page in their respective distinct form structures from the at least two discrete company sources.

5. A method as recited in claim 4 wherein three discrete company sources, each having unique variable database streams including company name data from the three discrete companies, and variable data streams, including alphanumeric characters which convey at least one of account and billing information, for the three companies, and distinct form structures for each of the three companies, are provided, and wherein steps (a)–(d) are practiced to image on the same document page three different variable data indicia, and variable database indicia, in three different form structures.

6. A method as recited in claim 5 wherein each of the variable database streams also include company logo data.

7. A method as recited in claim 4 wherein each of the variable database streams include company logo data and other direct market messages and images.

8. A method as recited in claim 5 wherein steps (a)–(d) are practiced to image on the same face of a sheet having a maximum length of about twelve inches and a maximum width of about nine inches.

9. A method as recited in claim 8 wherein step (c) is practiced to feed the paper in web form to the imaging system; and comprising the further step (e), after step (d), of cutting the web into individual single pages.

10. A method as recited in claim 9 wherein the imaging system includes a selective flexographic imaging system, and wherein step (d) is practiced to image some indicia on the single document pages flexographically.

11. A method as recited in claim 4 wherein steps (a)–(d) are practiced to image on the same face of a sheet having a maximum length of about twelve inches and a maximum width of about nine inches.

12. A method as recited in claim 11 wherein step (c) is practiced to feed the paper in web form to the imaging system; and comprising the further step (e), after step (d), of cutting the web into individual single pages.

13. A method as recited in claim 12 wherein the imaging system includes a selective flexographic imaging system, and wherein step (d) is practiced to image some indicia on the single document pages flexographically.

14. A method as recited in claim 4 wherein step (c) is practiced to feed the paper in web form to the imaging system; and comprising the further step (e), after step (d), of cutting the web into individual single pages.

15. A method as recited in claim 4 wherein the imaging system includes a selective flexographic imaging system, and wherein step (d) is practiced to image some indicia on the single document pages flexographically.

16. A method as recited in claim 4 wherein step (d) is also practiced to image name and address information for a predetermined individual corresponding to said account and billing information, and further comprising (e) inserting the document page into an envelope also containing address indicia thereon identifying the predetermined individual.

17. A single document page with multiple different variable indicia thereon, from at least two discrete company sources, each discrete source having a distinct form structure, produced using a computer control and an imaging system, and produced by the steps of:

(a) feeding variable database streams, including company name data from the at least two discrete companies, and feeding variable data streams, including alphanumeric characters which convey at least one of account and billing information, for the at least two companies, and feeding distinct form structures from the at least two discrete company sources, to the same computer control;

(b) using the same computer control, controlling an imaging system to merge the variable database streams, distinct form structures, and variable data streams, from the at least two discrete company sources so that they may be imaged on the same document page;

(c) feeding paper to be imaged to the imaging system; and (d) using the imaging system, imaging the same document page with variable data indicia, including at least one of account and billing information for each company name, and variable database indicia including company names, on the same document page in their respective distinct form structures from the at least two discrete company sources.

18. A document page as recited in claim 17 and further produced by a method wherein step (c) is practiced to feed the paper in web form to the impaging system; and by the further step (e), after step (d), of cutting the web into individual single pages including said document page.

19. A document page as recited in claim 17 wherein the document page includes variable data indicia and variable database indicia from three different company sources, each in a discrete form structure on the page for each of the three different companies.

20. A document page as recited in claim 19 wherein the variable database streams include company logo data, so that the document page includes three different company names and logos, and three different account and/or billing information character sets, and three different form structures for each of the three different companies.

21. A document page as recited in claim 17 wherein the variable database streams include company logo data, so that the document page includes at least two different company names and logos, and at least two different account and/or billing information character sets.

* * * * *